United States Patent [19]

Nonami

[11] Patent Number: 4,922,527
[45] Date of Patent: May 1, 1990

[54] SMALL ELECTRONIC APPARATUS

[75] Inventor: Takyuki Nonami, Hyogo, Japan

[73] Assignee: Mitsubishi Denki Kabushiki Kaisha, Tokyo, Japan

[21] Appl. No.: 306,945

[22] Filed: Feb. 7, 1989

[30] Foreign Application Priority Data

Jul. 15, 1988 [JP] Japan ................. 63-175230

[51] Int. Cl.⁵ .......................................... H04M 1/00
[52] U.S. Cl. .................................... 379/361; 379/368
[58] Field of Search ............... 379/368, 352, 360, 361, 379/362, 387, 395, 61

[56] References Cited

U.S. PATENT DOCUMENTS 4,496,799  1/1985  Kingen et al. ............ 379/361 X
4,528,681  7/1985  Fulcomer, Jr. ........... 379/361 X
4,571,462  2/1986  Janssen .................. 379/361

OTHER PUBLICATIONS

J. J. A. Geboers, "Bipolar IC's for DTMF telephone dialling" Philips Technical publication 050, 1982.

Primary Examiner—James L. Dwyer
Attorney, Agent, or Firm—Birch, Stewart, Kolasch & Birch

[57] ABSTRACT

A small electronic apparatus has a plurality of keys for inputting telephone numbers of communication destination, and when each key is depressed, confirmation sound is generated by a sound generating means. The apparatus is provided with structure for generating signals in combination of signals of multiple frequencies and for supplying it to the sound generating means, thereby the composite signal becomes the input frequency in which the sound generating means indicates good output characteristics, and when the sound generating means generates sound, distinction of each key can be performed.

19 Claims, 6 Drawing Sheets

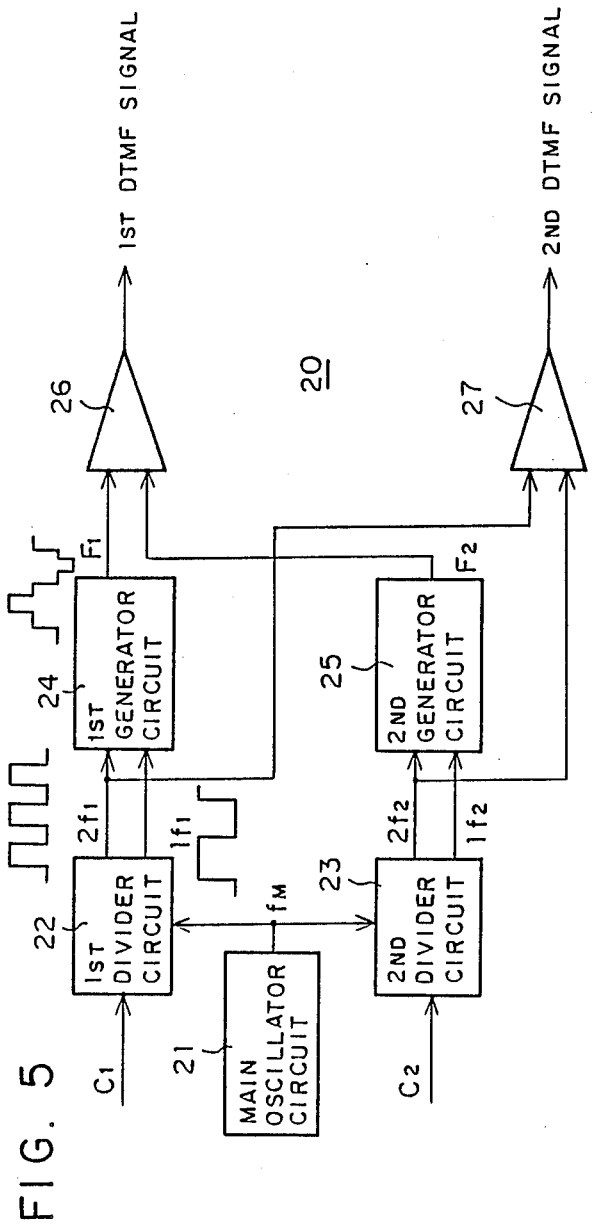
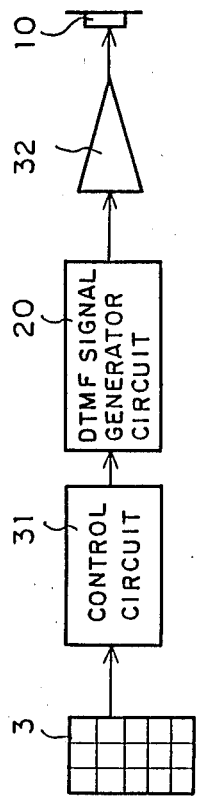
FIG. 5
FIG. 6

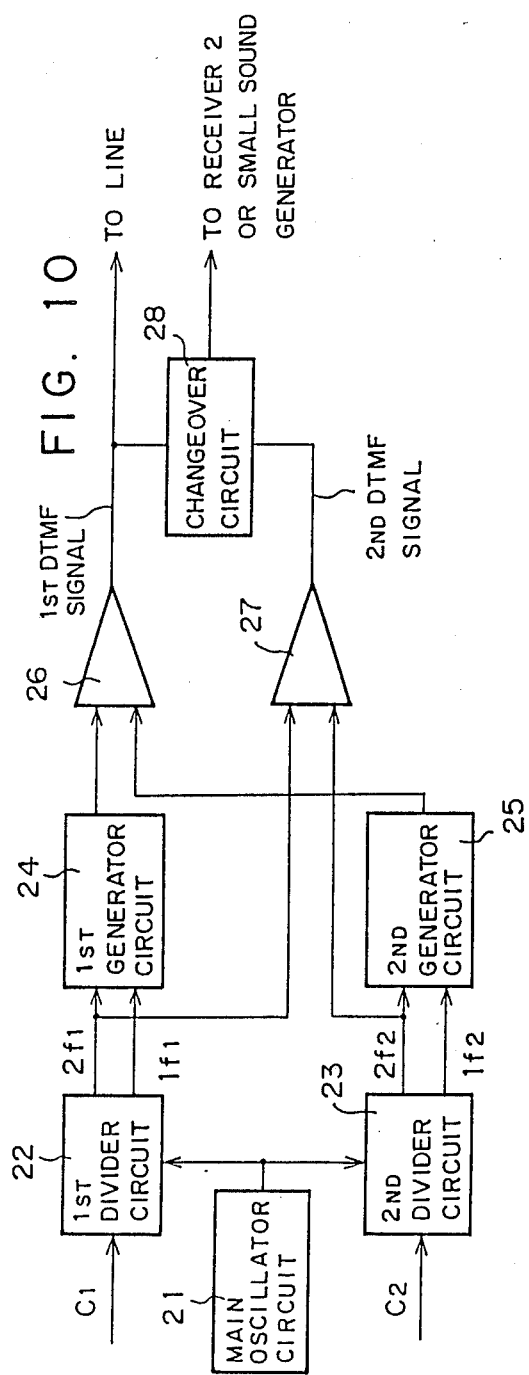
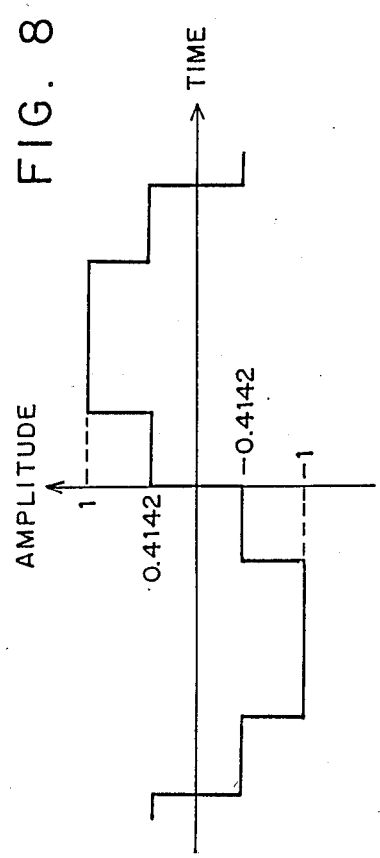
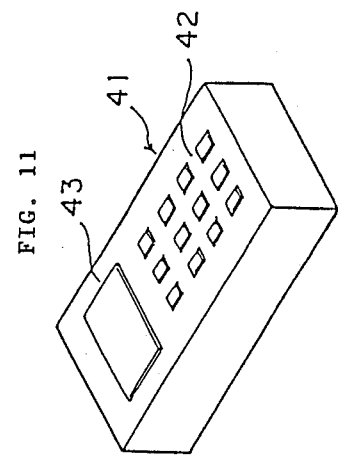

SMALL ELECTRONIC APPARATUS

BACKGROUND OF THE INVENTION

1. Field of the Invention

The present invention relates to a small electronic apparatus comprising a plurality of keys, a key input means which inputs signals for a prescribed device to execute prescribed operation from the keys respectively, and a sound generating means which generates different sounds for respective keys in response to the key input signals from the key input means.

2. Description of the Prior Art

FIG. 1 is a perspective view of a portable telephone as an example of a small electronic apparatus in the prior art. In FIG. 1, numeral 1 designates a body of the portable telephone, numeral 2 designates a receiver installed on the front side of the body 1 in the figure and having a speaker enclosed therein, numeral 3 designates a key input member comprising a plurality of keys for inputting telephone numbers, numeral 4 designates a small sound generator installed on the upper side of the body 1 in the figure and constituted, for example, by a piezoelectric buzzer enclosed in the body 1, and numeral 5 designates an antenna. In addition to the speaker and the piezoelectric buzzer, a circuit of the telephone is enclosed in the body 1.

FIG. 2 shows a circuit for generating confirmation sounds when the keys are operated respectively in the telephone of the prior art. In FIG. 2, numeral 6 designates a control circuit which processes the key input signals from the key input member 3 and supplies control signals responding to the key input signals to a single tone generating circuit 7 and a DTMF (Dual Tone Multi-Frequency) signal generator circuit 8. The single tone generator circuit 7 generates confirmation sounds of the actuated keys in the same single tone sounds for each key in response to control signals from the control circuit 6, and when the control signal is received the single tone generating circuit 7 generates an output signal during prescribed periods only. The output signal from the single tone generating circuit 7 is amplified by an amplifier 9 and supplied to a piezoelectric buzzer 10 of the small sound generator 4. The buzzer 10 is driven, and the same single tone sound for each key is generated during the prescribed period only as the confirmation sound of the key operation.

The DTMF signal generating circuit 8 generates DTMF signals as a combination of signals of different frequencies responding to the control signals from the control circuit 6, and outputs the DTMF signals to a telephone circuit (not shown) such as a modulator installed on side of the antenna 5. The DTMF signal is modulated, and then transmitted from the antenna 5 to a radio device installed in a telephone exchange in a telephone network. Thus selective signals for a telephone in communication destination by the DTMF signal, or a service request signal to the telephone exchange is transmitted to the telephone exchange.

FIG. 3 shows the assignment of frequency signals of the DTMF signals corresponding to each key. For example, the DTMF signal corresponding to "8" is the combination of signal of 852 Hz and signal of 1366 Hz, and if the key of "8" is depressed, the circuit shown in FIG. 2 generates the signal of 852 Hz and the signal of 1366 Hz simultaneously.

On the other hand, the DTMF signal is amplified by an amplifier 11 and then outputted as DTMF sound from a speaker 12 of the receiver 2 so that the operator can confirm the transmission of selective signals or the like. In this case, tone of the DTMF sound is different for each key, and the distinction of the actuated keys is possible with its tone.

Since the small electronic apparatus in the prior art is constituted as above described, when key confirmation of a plurality of keys installed in the key input member 3 is performed with the above-mentioned single tone sound and the DTMF sound, the following problems exist respectively.

In the first case of the single tone sound, although the key confirmation sound of sufficient volume is generated by the small sound generator 4 using the piezoelectric buzzer 10, since the sound generating band of the piezoelectric buzzer 10 generally available is often deviated from the frequency band of the DTMF signals from the DTMF signal generating circuit 8, the piezoelectric buzzer 10 cannot be driven by the DTMF signal and a different tone for each key generated at large sound volume whereby the operator confirms the operation key. That is, the distinction of the actuated keys cannot be performed.

For example, FIG. 4 shows a characteristic diagram of input frequency - output sound pressure level of a piezoelectric buzzer manufactured by JAPAN PIEZO CO., LTD. In this example, portions indicating good characteristics are seen in the vicinity of 600 Hz and the vicinity of 4000 Hz, and there is the deviation from the frequency band of the DTMF signals.

On the other hand, in the second case of the DTMF sound, since the DTMF signal drives the speaker 12 of the receiver 2, the distinction of the actuated keys can be performed, but the sound volume is small and the sound cannot be heard when the receiver 2 is separated from the user's ears. In order to obtain a sufficient sound volume, the receiver 2 having the speaker 12 with a diameter of 10 cm or more is required, thereby size for a small electronic apparatus, for example, the portable telephone inevitably becomes of large scale and heavy weight.

SUMMARY OF THE INVENTION

In order to eliminate the above-mentioned problems in the prior art, an object of the invention is to provide a small electronic apparatus wherein the confirmation of actuated keys can be easily performed without making the apparatus of large scale and heavy weight and the carrying of the apparatus is not obstructed.

A small electronic apparatus according to the invention comprises a key input means having a plurality of keys, means for generating signals of frequencies different in respective keys corresponding to key input signals from the key input means, and a sound generating means for inputting the above-mentioned signals to generate different sounds.

In the small electronic apparatus of the invention, confirmation sounds of respective keys of different tones responding to different ones of the actuated keys are generated at sufficient volume from the sound generating means, thereby the distinction of the actuated keys can be performed.

BRIEF DESCRIPTION OF THE DRAWINGS

FIG. 5 is a block diagram showing a DTMF signal generator circuit of a portable telephone as a first embodiment of the invention;

FIG. 6 is a block diagram showing a sound generator circuit;

FIG. 8 is a waveform chart of a pseudo sinusoidal wave by the DTMF signal generator circuit shown in FIG. 7;

FIG. 10 is a block diagram showing a DTMF signal generator circuit of a portable telephone as a third embodiment of the invention; and FIG. 11 is an appearance view of a desk computer according to the invention.

DETAILED DESCRIPTION OF THE PREFERRED EMBODIMENTS

As above described, the DTMF signal is a signal including the combination of two frequencies, but when the DTMF signal is made audible sound, it is recognized as a pair of tones associated with the number or symbol of a given key by the operator. In this case, however, since the DTMF signal is not a signal of single frequency, a difference of two frequencies is actually recognized by the operator.

Consequently, it is effective that each frequency of the DTMF signal is shifted and supplied to the sound generating means so that the sound generating means such as a piezoelectric buzzer can generate sounds most efficiently and each key can be distinguished.

Figure 1:
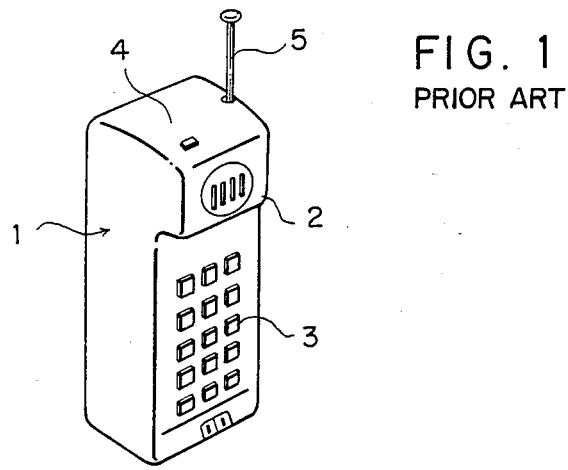
FIG. 1 is a perspective view of a portable telephone showing the external appearance thereof.
Figure 2:
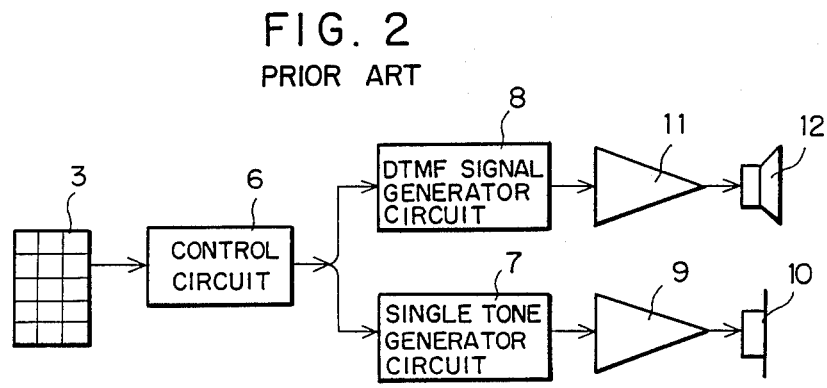
FIG. 2 is a block diagram showing a circuit in the prior art for generating confirmation sounds of the portable telephone shown in FIG. 1.
Figure 3:
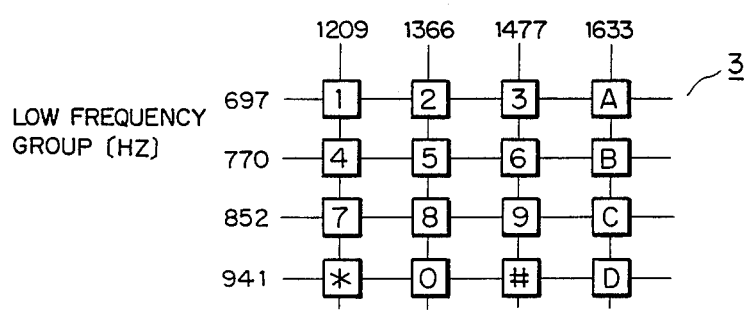
FIG. 3 is a frequency assignment diagram showing the relationship between DTMF signals and keys.
Figure 4:
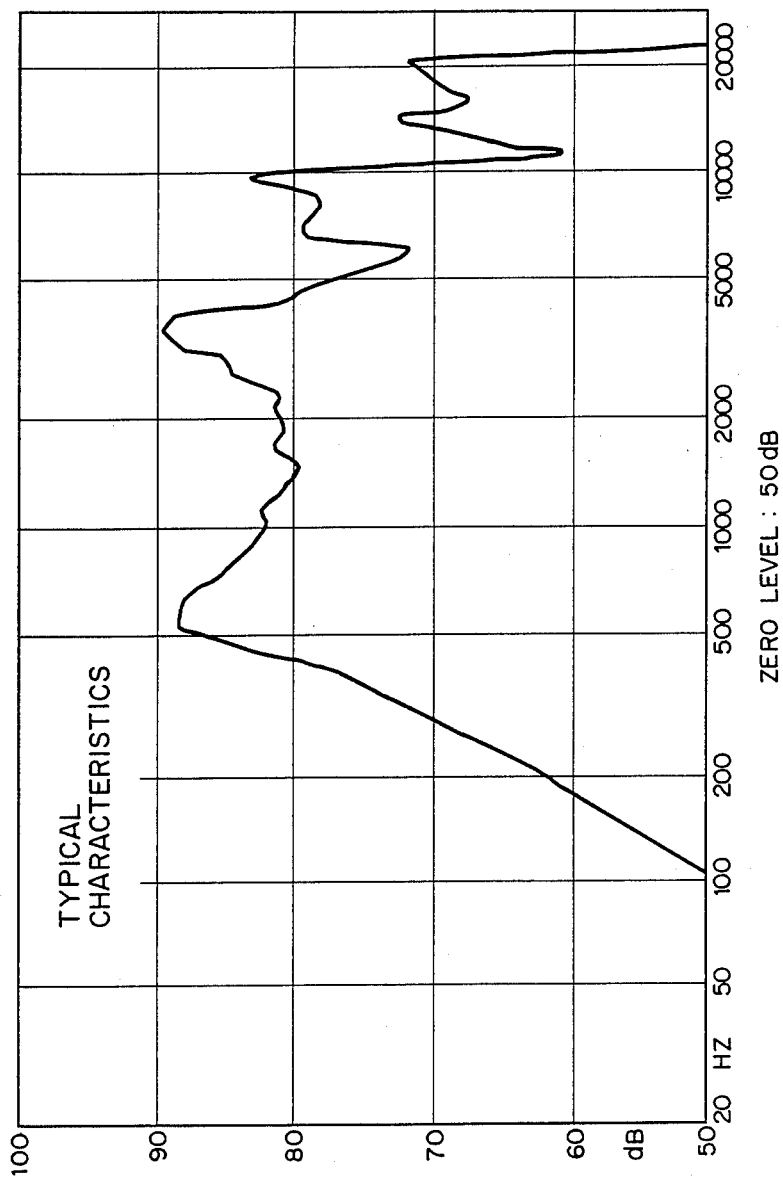
FIG. 4 is a characteristic diagram illustrating input frequency - output sound pressure level of a piezoelectric buzzer.

FIG. 5 is a block diagram of a DTMF signal generator circuit of a portable telephone as a first embodiment of the invention in which the DTMF signals are generated and doubles the frequency of the DTMF signals. This embodiment is the same portable telephone as that in the example of the prior art shown in FIG. 1. In FIG. 5, numeral 21 designates a main oscillator circuit, and a frequency signal $f_M$ has sufficiently high frequency and can be converted into each frequency shown in FIG. 3 by the frequency divider. Numeral 22 designates a first variable frequency divider circuit which divides the frequency of the frequency signal $f_M$ and generates square waves $2f_1$, $1f_1$ for a first pseudo sinusoidal wave generator circuit 24 in accordance with control signal $C_1$ from a CPU (not shown), numeral 23 designates a second variable frequency divider circuit which also generates square waves $2f_2$, $1f_2$ for a second pseudo sinusoidal wave generator circuit 25 in accordance with control signal $C_2$ from the CPU, numeral 24 designates a first pseudo sinusoidal wave generator circuit which generates a pseudo sinusoidal wave $F_1$ from the square waves $2f_1$, $1f_1$, numeral 25 designates a second pseudo sinusoidal wave generator circuit which generates a pseudo sinusoidal wave $F_2$ from the square waves $2f_2$, $1f_2$, numeral 26 designates a first adder which adds the pseudo sinusoidal waves $F_1$, $F_2$ and outputs a first DTMF signal having normal frequencies, and numeral 27 designates a second adder which adds the square waves $2f_1$, $2f_2$ and outputs a second DTMF signal having frequencies of two times of the normal frequencies.

FIG. 6 shows a second generator circuit which utilizes the second DTMF signal and generates different confirmation sounds for respective keys. In FIG. 6, numeral 31 designates a control circuit which processes a key input signal from each key of key input members 3 as key input means and outputs a control signal responding thereto, numeral 20 designates a DTMF signal generator circuit of the first and second DTMF signals described in FIG. 5, numeral 32 designates an amplifier which amplifies the second DTMF signal, and numeral 10 designates a piezoelectric buzzer as a sound generating means.

Next, operation will be described. The frequency signal $f_M$ outputted by the main oscillator circuit 21 is inputted to the first variable divider circuit 22 and the second variable divider circuit 23. Then the first variable divider circuit 22 performs the frequency division of the frequency signal $f_M$ into square waves $2f_1$, $1f_1$ in accordance with the control signal $C_1$ from the CPU. In this case, the frequency of the square wave $1f_1$ is that corresponding to the frequency of a desired sinusoidal signal $F_1$, and the frequency of the square wave $2f_1$ is that of two times of the square wave $1f_1$. Using the two square waves $2f_1$, $1f_1$, the first a pseudo sinusoidal wave generator circuit 24 composes a pseudo sinusoidal wave $F_1$. Thereby one signal can be obtained among two frequency signals to constitute the first DTMF signal of normal frequency. A pseudo sinusoidal wave $F_2$ to give a residual one frequency signal can be also obtained by the second variable divider circuit 23 and the second pseudo sinusoidal wave generator circuit 25. Subsequently, the first adder 26 adds the pseudo sinusoidal waves $F_1$, $F_2$ and outputs the first DTMF signal of normal frequency.

Figure 7:
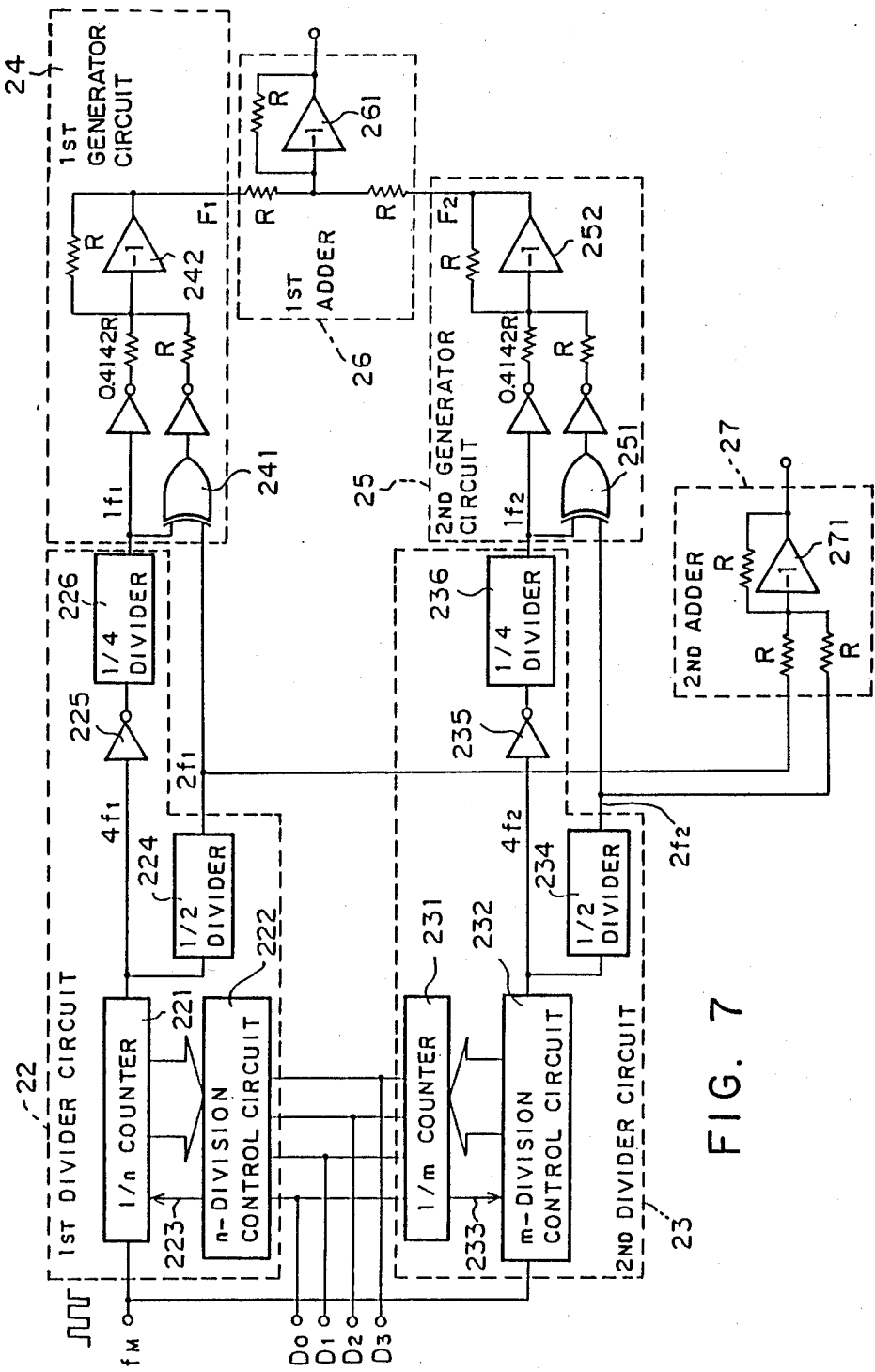
FIG. 7 is a circuit diagram showing a DTMF signal generator circuit.

FIG. 7 is a circuit diagram showing a preferred embodiment of the DTMF signal generator circuit shown in FIG. 5. Operation of this circuit will be described. The first variable divider circuit 22 is composed of 1/n counter 221, n-division control circuit 222 which controls the frequency dividing ratio n of the 1/n counter 221 in accordance with control signals $D_0$–$D_3$ received from the CPU, ½ divider 224, an inverter 225 and ¼ divider 226. First, the frequency signal $f_M$ outputted from the main oscillator circuit 21 is sent to the 1/n counter 221. On the other hand, in the n-division control circuit 222, the frequency dividing ratio n is set in accordance with the control signals $D_0$–$D_3$. After the setting, the n-division control circuit 222 outputs reset signal 223 when the count value of the 1/n counter 221 becomes n. Thus the 1/n counter 221 outputs a clock signal of frequency $4f_1$. The signal of $4f_1$ is converted into a clock signal of frequency $2f_1$ by the ½ divider 224 and into a clock signal of frequency $f_1$ by the ¼ divider 226.

The second variable divider circuit 23 also performs quite the same operation as that of the first variable divider circuit 22 except for the difference of the frequency dividing ratio m, and outputs clock signal of frequencies of $2f_2$ and $1f_2$.

The first pseudo sinusoidal wave generator circuit 24 is composed of an exclusive OR circuit 241 and an adder comprising an operational amplifier 242 and other elements. First, the signal of frequency $1f_1$ and the signal of frequency $2f_1$ are subjected to exclusive-OR operation by the exclusive OR circuit 241, and then outputted to one input terminal of the adder. The signal of frequency $1f_1$ is also outputted to the other input terminal of the adder. The adder adds the two input signals in ratio of 1:0.4142 so as to cancel the harmonics frequencies of even order and 3, 5, 11, 13, 19, 21, ... order, and outputs first a pseudo sinusoidal wave $F_1$ as shown in FIG. 8.

The second sinusoidal wave generator circuit 25 also performs quite the same operation as that of the first sinusoidal wave generator circuit 24, and outputs a second pseudo sinusoidal wave $F_2$.

Next, the pseudo sinusoidal waves $F_1$, $F_2$ are added by the first adder 26 composed of an operational amplifier 261 and resistors, thereby a first DTMF signal of normal frequency can be obtained.

The first DTMF signal obtained as above described is outputted to a telephone circuit (not shown).

On the other hand, the second adder 27 adds the square waves $2f_1$, $2f_2$, and outputs a second DTMF signal having frequency of two times of the first DTMF signal. The second DTMF signal is sent to the sound generator circuit shown in FIG. 6. That is, when a key of the key input member 3 is operated, and a control signal responding to the actuated key is outputted from the control circuit 31, the second DTMF signal is generated by the DTMF signal generator circuit 20 in FIG. 5, and transmitted to the amplifier 32. Thereby sounds are generated in different tones responding different ones of actuated keys by the small sound generator 4 as a sound generator means. In this case, since the sound volume of the small sound generator 4 is sufficiently large, when the receiver 2 is removed from the user's ears so that telephone number is key-inputted from the key input member 3, respective ones of the actuated keys can be accurately confirmed by the sounds generated by the second DTMF signal as a combination of different frequencies.

In the first embodiment, although the frequencies of the second DTMF signal are made two times of those of the first DTMF signal, the input frequency in which the sound generator means indicates good output characteristics is not limited to two times of the frequency of the DTMF signal. Consequently, the frequency of the DTMF signal may be shifted in an arbitrary ratio so as to properly obtain the second DTMF signal.

Figure 9:
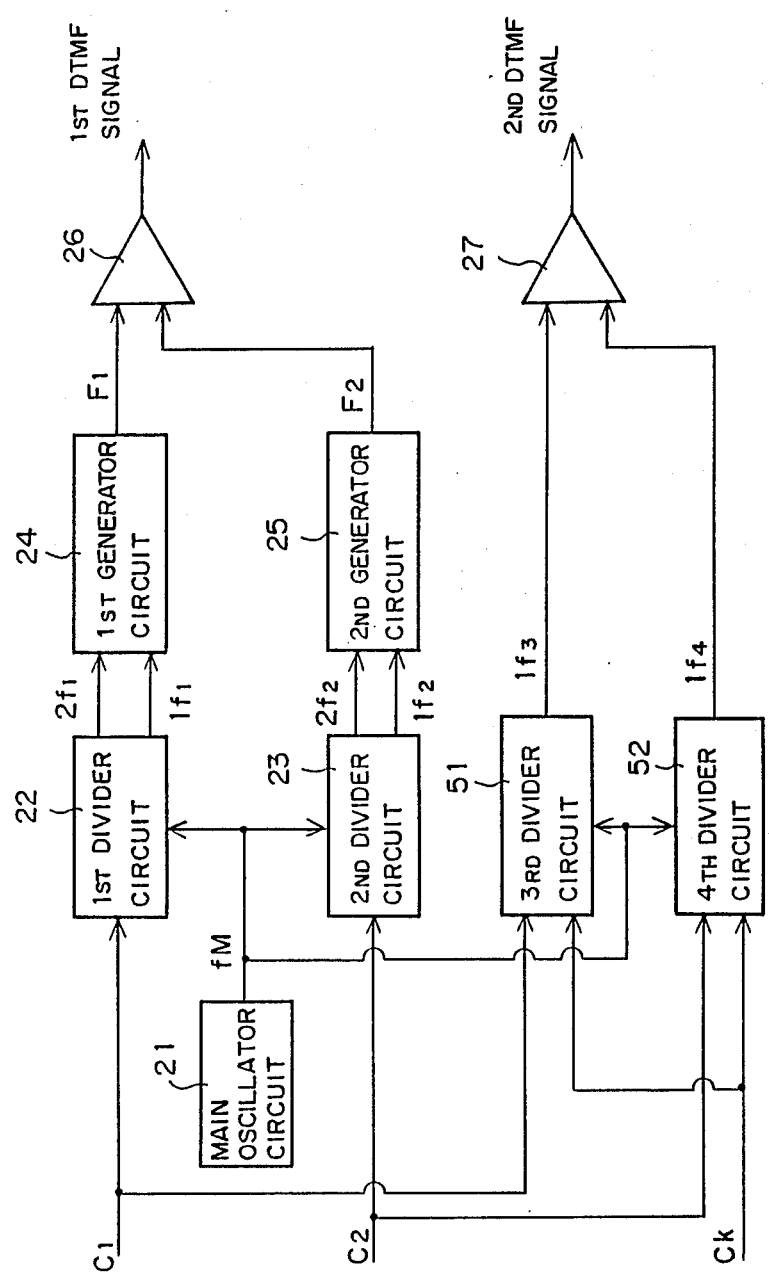
FIG. 9 is a block diagram showing a DTMF signal generator circuit of a portable telephone as a second embodiment of the invention.

FIG. 9 is a block diagram of a DTMF signal generator circuit as a second embodiment of the invention where the frequencies of DTMF signal are multiplied by an arbitrary coefficient to obtain the second DTMF signal. Operation of this circuit will be described. Receiving control signals $C_1$, $C_2$ and division ratio control signal $C_k$ from the CPU, a third variable divider circuit 51 and a fourth variable divider circuit 52 perform similar operation to that of the first variable divider circuit 22, and output signals of frequencies $1f_3$ and $1f_4$. In this case, the variable divider circuits 51, 52 are constituted in the relation that $f_3 = kf_1$, $f_4 = kf_2$. Wherein the value of k may be constant, or may be variable corresponding to ones of the DTMF signals.

The third variable divider circuit 51 and the fourth variable divider circuit 52 may be constituted in the relation that frequency of the output signal does not become k times the frequency of the first DTMF signal. In this case, the third variable divider circuit 51, the fourth variable divider circuit 52 and the CPU may be constituted to generate signals of different frequencies respectively in response to respective ones of the DTMF signals, i.e., corresponding to respective keys.

FIG. 10 is a block diagram showing a DTMF signal generator circuit as a third embodiment of the invention. The third embodiment as shown in FIG. 10 further comprises a changeover circuit 28 added thereto, whereby the first DTMF signal is transmitted to the line and also through the changeover circuit 28 to the receiver 2. That is, when the confirmation sounds of the key operation are generated in different tones from the receiver 2, the first DTMF signal may be supplied to the receiver 2 by the changeover circuit 28. On the other hand, when the confirmation sounds of the key operation are generated in different tones from the small sound generator 4, the second DTMF signal may be supplied to the small sound generator 4 by the changeover circuit 28. When the confirmation sounds are generated from the receiver 2, they can be utilized as a busy tone, calling failure or the like.

In the first through third embodiments, although the piezoelectric buzzer 10 is used as the small sound generator 4, such a small sound generator is not limited to a piezoelectric buzzer.

Further in the first through third embodiments, although the invention is applied to the portable telephone, the invention can be applied to any other small electronic apparatus as long as it is portable and has a key input member provided with a plurality of keys. FIG. 11 shows an example of a desk computer. In FIG. 11, numeral 41 designates a body, numeral 42 designates a key input member as a key input means provided with a plurality of keys, and numeral 43 designates a display unit thereof. In the body 41, in addition to a circuit for executing functions of the desk computer, a sound generator circuit as a sound generating means for generating the confirmation sounds in different tones in response to ones of respective keys of the key input member 42, a sound generator such as a piezoelectric buzzer and the like are enclosed.

Further as another small electronic apparatus, a small electronic apparatus for outputting command signals by radio to other prescribed devices in response to key inputs from the key input member may be used. In this case, when the keys are operated, confirmation sounds of the operation keys are generated in different tones for respective keys.

What is claimed is:

1. A portable telephone comprising:
    key input means having a plurality of keys for dialing a selected telephone number;
    sound generator means for generating sounds of distinguishable tones related to the identity of actuated keys of the key input means in response to control signals in a predetermined frequency range;
    means for generating dual-tone multi-frequency key identification signals in response to the actuation of each respective key of said key input means, said dual-tone multi-frequency signals having a frequency range within a standard telephone service band outside of the predetermined frequency range to which said sound generator means is responsive; and
    converter means for frequency shifting said dual-tone multi-frequency signals into control signals within said predetermined frequency range, and for applying said frequency-shifted control signals to said sound generator means.

2. The telephone of claim 1 wherein said predetermined frequency range of the sound generator means includes frequencies much higher than the frequencies within the service band of the dual-tone multi-frequency signals.

3. The telephone of claim 2 wherein said sound generator means includes a loud speaker with a diameter less than 10 cm.

4. The telephone of claim 2 wherein said sound generator means is a piezoelectric buzzer.

5. The telephone of claim 1 wherein said converter means doubles the frequency of said dual-tone multi-frequency signals to generate control signals within the predetermined frequency range of the sound generator means.

6. A portable electronic device for performing predetermined functions comprising:
key input means having a plurality of keys for instructing the device to perform one or more of the predetermined functions;
sound generator means for generating sounds of distinguishable tones related to the identity of actuated keys of the key input means in response to control signals in a predetermined frequency range;
means for generating multi-frequency key identification signals in response to the actuation of each respective key, said multi-frequency signals having a frequency range outside of the predetermined frequency range to which said sound generator means is responsive;
converter means for frequency shifting said multi-frequency signals into control signals within said predetermined frequency range; and
means for applying said control signals generated by said converter means to said sound generator means to generator said sound of distinguishable tones.

7. The device of claim 6 wherein said device is a telephone.

8. The device of claim 6 wherein said device is a wireless telephone.

9. The device of claim 6 wherein said device is a computer.

10. A method for audibly indicating, by a plurality of sounds of distinguishable tones, the actuation of selected keys from a plurality of keys in a telephone have been actuated and sound generator means for generating said sounds of distinguishable tones related to the identity of actuated keys in response to control signals in a predetermined frequency range, comprising the steps of:
generating dual-tone multi-frequency key identification signals in response to the actuation of each respective key, said dual-tone multi-frequency signals having a frequency range within a standard telephone service band outside of the predetermined frequency range to which said sound generator means is responsive;
frequency shifting said dual-tone multi-frequency signals into control signals within said predetermined frequency range; and
applying said control signals generated in said shifting step to said sound generator means to generate said sounds of distinguishable tones.

11. A portable telephone comprising:
key input means having a plurality of keys for dialing a selected telephone number;
first sound generator means for generating sounds of distinguishable tones related to the identity of actuated keys of the key input means in response to control signals in a predetermined frequency range, said sounds being generated at volumes sufficient to be heard at a first distance from said telephone;
means for generating dual-tone multi-frequency key identification signals in response to the actuation of each respective key, said dual-tone multi-frequency signals having a frequency range within a standard telephone service band outside of the predetermined frequency range to which said sound generator means is responsive;
second sound generator means responsive to said dual-tone multi-frequency signals for generating sounds of distinguishable tones related to the identity of actuated keys, the sounds generated by said second sound generator means being of lower volumes than those generated by said first sound generator means so that said sounds can only be heard at a second distance from said telephone which is less than said first distance;
converter means for frequency shifting said dual-tone multi-frequency signals into control signals within said predetermined frequency range; and
means for applying said frequency-shifted control signals to said first sound generator means to generate said sounds of distinguishable tones, and applying said dual-tone multi-frequency signals to said second sound generator means.

12. The telephone of claim 11 wherein said predetermined frequency range for the first sound generator means includes frequencies much higher than the frequencies within the service band of the dual-tone multi-frequency signals.

13. The telephone of claim 12 wherein said first sound generator means includes a loud speaker with a diameter less than 10 cm.

14. The telephone of claim 12 wherein said first sound generator means is a piezoelectric buzzer.

15. The telephone of claim 11 wherein said converter means doubles the frequency of said dual-tone multi-frequency signals to generate control signals within the predetermined frequency range of the first sound generator means.

16. The telephone of claim 11 wherein said second sound generator means is a loud speaker in the telephone receiver which normally outputs voice sounds.

17. The telephone of claim 14 wherein said second sound generator means is a loud speaker in the telephone receiver which normally outputs voice sounds.

18. The telephone of claim 17 wherein said means for applying said frequency-shifted control signals includes switch means connected to said converter means and said means for generating dual-tone multi-frequency signals selectively directing said frequency-shifted control signals to said first sound generator means or dual-tone multi-frequency signals to said second sound generator means.

19. The telephone of claim 11 wherein said means for applying said frequency-shifted control signals includes switch means connected to said converter means and said means for generating dual-tone multi-frequency signals selectively directing said frequency-shifted control signals to said first sound generator means and dual-tone multi-frequency signals to said second sound generator means.

* * * * *